United States Patent
Oberhauser et al.

(10) Patent No.: US 7,770,304 B2
(45) Date of Patent: Aug. 10, 2010

(54) POSITION-MEASURING DEVICE AND METHOD FOR DETERMINING ABSOLUTE POSITION

(75) Inventors: Johann Oberhauser, Vachendorf (DE); Thomas Schuermann, Rosenheim (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 127 days.

(21) Appl. No.: 12/330,945

(22) Filed: Dec. 9, 2008

(65) Prior Publication Data
US 2009/0161121 A1 Jun. 25, 2009

(30) Foreign Application Priority Data
Dec. 19, 2007 (DE) .................. 10 2007 061 287

(51) Int. Cl.
*G01D 5/347* (2006.01)
(52) U.S. Cl. .......................... 33/707; 33/1 PT
(58) Field of Classification Search ............... 33/1 PT, 33/1 N, 706, 707, 708
See application file for complete search history.

(56) References Cited

U.S. PATENT DOCUMENTS

| 4,519,709 | A | * | 5/1985 | Nelle | 33/707 |
|---|---|---|---|---|---|
| 5,129,725 | A | * | 7/1992 | Ishizuka et al. | 33/707 |
| 5,456,021 | A | * | 10/1995 | Nelle et al. | 33/707 |
| 5,678,319 | A | * | 10/1997 | Huber | 33/707 |
| 6,093,928 | A | * | 7/2000 | Ohtomo et al. | 33/707 |
| 6,170,162 | B1 | * | 1/2001 | Jacobsen et al. | 33/1 PT |
| 7,013,575 | B2 | | 3/2006 | Strasser et al. | |
| 7,289,229 | B2 | * | 10/2007 | Otsuka | 33/706 |
| 2003/0145479 | A1 | * | 8/2003 | Mayer et al. | 33/707 |
| 2005/0072016 | A1 | * | 4/2005 | Strasser et al. | 33/706 |
| 2006/0283035 | A1 | * | 12/2006 | Gordon-Ingram | 33/707 |
| 2007/0186431 | A1 | * | 8/2007 | Mittmann et al. | 33/707 |
| 2007/0271805 | A1 | * | 11/2007 | Holzapfel | 33/707 |
| 2009/0271998 | A1 | * | 11/2009 | Carlen et al. | 33/706 |
| 2010/0011603 | A1 | * | 1/2010 | Finkler | 33/706 |

FOREIGN PATENT DOCUMENTS

DE 102 44 235 3/2004

* cited by examiner

*Primary Examiner*—G. Bradley Bennett
(74) *Attorney, Agent, or Firm*—Kenyon & Kenyon LLP

(57) ABSTRACT

A position-measuring device includes a code and a scanning unit. The code includes a sequence of code elements arranged one after the other in a measuring direction, at least two successive code elements in each case forming one code word having position information. The scanning unit includes a lighting unit for emitting directed light in the direction of the code for imaging at least the code elements forming code word onto a detector unit, the detector unit having in measuring direction at least two detector elements per code element forming code word, as well as an evaluation unit in which the code word having the instantaneous position information is ascertainable from the detector signals of the detector elements. The scanning unit and the code are arranged in a manner allowing movement relative to each other in measuring direction. The detector signals to be evaluated for forming the code word are selectable in the evaluation unit as a function of the imaging of the code elements forming code word onto the detector unit.

23 Claims, 7 Drawing Sheets

POSITION-MEASURING DEVICE AND METHOD FOR DETERMINING ABSOLUTE POSITION

CROSS-REFERENCE TO RELATED APPLICATIONS

The present application claims priority to Application No. 10 2007 061 287.9, filed in the Federal Republic of Germany on Dec. 19, 2007, which is expressly incorporated herein in its entirety by reference thereto.

FIELD OF THE INVENTION

The present invention relates to a position-measuring device for determining absolute position and to a method for determining absolute position.

BACKGROUND INFORMATION

Increasingly in many fields, absolute position-measuring devices are being used, in which the absolute position information is derived from a code track having code elements disposed one after the other in the measuring direction. The code elements are distributed pseudo-randomly, so that in each case a certain number of successive code elements forms a bit pattern. A new bit pattern is formed in response to the shift of the scanning unit in relation to the code track by a single code element, and a sequence of different bit patterns is available over the entire measuring range to be recorded absolutely.

A sequential code of this kind is referred to as chain code or pseudo-random code (PRC). A particularly interference-free variant of a pseudo-random code is obtained if the code elements have what is referred to as a Manchester coding, which means that the code elements have two sub-areas of equal size which exhibit properties complementary to each other. The binary information is determined by the sequence of the sub-areas.

German Published Patent Application No. 102 44 235 describes a position-measuring device of this type whose absolute code track is made up of a pseudo-random arrangement of code elements having a Manchester coding. To determine whether the scanning signals of detector elements have values valid for the evaluation of the position information, it is first of all provided to use scanning signals of an incremental track, which extends parallel to the absolute code track, to select the detector elements necessary for the evaluation of the absolute track. Secondly, to evaluate the reliability of the detector signals, it is proposed to split the detector elements into one group having even-numbered detector elements and one group having uneven-numbered detector elements, and in each case to form differential signals of directly succeeding detector elements of each group, and to compare them to a comparison value. The position value is ultimately formed from the valid scanning signals resulting from the comparison.

One widely prevalent functioning principle is optical scanning. In that case, a measuring graduation, which is applied on a measuring standard, is imaged onto a number of photodetectors by directed light emitted from a light source. The measuring standard is movably disposed in the optical path of the light and modulates the light when the measuring graduation is moved relative to the light source and the photodetectors. The position information is ascertained by evaluating the output signals of the photodetectors. The measuring standard is a circular graduation disk or a linear scale, depending on whether a rotary or linear position-measuring device is involved. The measuring graduation may be made up of one or more tracks with regions having different optical characteristics such as transparent/opaque or reflective/non-reflective.

For the reading of the code elements, absolute position-measuring devices whose code track is in the form of a PRC require a great number of detector elements placed relative to each other at an exactly defined distance, which is a function of the code elements to be read. Preferably, the detector elements are combined as a detector array on a semiconductor chip. When working with such an optical scanning principle, it is especially problematic that the reliability of the reading of the code track is dependent on the precision of the imaging of the part of the code track relevant for the reading, onto the detector array. This is a function of the geometrical configuration of the light source, code track and detector elements. For example, if the alignment of the light deviates from that called for, determined by the code track and the detector array, then not all the detector elements used for ascertaining the instantaneous position receive the same quantity of light. Because of this, undefined states may occur and false position values may even be ascertained.

SUMMARY

Example embodiments of the present invention provide a position-measuring device having improved dependability and/or operational reliability. Example embodiments of the present invention provide a method for determining absolute position that exhibits improved dependability and/or operational reliability According to example embodiments of the present invention, a position-measuring device includes: a code including a sequence of code elements arranged one after another in a measurement direction, at least two successive code elements forming one code word having position information; and a scanner unit, the scanner unit and the code arranged to permit movement relative to each other in the measurement direction. The scanner unit includes: a detector unit having, in the measurement direction, at least two detector elements per code element forming the code word; a light unit adapted to emit directed light in a direction of the code to image at least the code elements forming the code word onto the detector unit; and an evaluation unit adapted to ascertain, from detector signals of the detector elements, the code word having instantaneous position information and to select the detector signals to be evaluated to form the code word as a function of the imaging of the code elements forming the code word onto the detector unit.

The code elements may include two successive sub-areas in the measurement direction that have properties complementary to each other, and at least two detector elements may be provided per sub-area.

The evaluation unit may include a signal-processing unit adapted to generate digital position signals from the detector signals.

The signal-processing unit may include trigger modules adapted to generate the digital position signals from the detector signals based on subtraction, and each trigger module may be arranged to receive two detector signals from detectors that have a same distance in the measurement direction as two sub-areas disposed one after another in the measurement direction.

The evaluation unit may include a device adapted to form the code word by selection of position signals based on correction information and a fine-position value.

The evaluation unit may include: a selection unit adapted to receive the digital position signals and to output corrected positional signals; and a correction unit adapted to determine a section of the corrected position signal based on the correction information and the fine-position value.

The correction information may include static assignment information and/or position-dependent assignment information.

The evaluation unit may include a memory unit adapted to store the assignment information.

The evaluation unit may include at least one temperature sensor, and the correction information may include temperature-dependent assignment information.

The evaluation unit may include a code-word ascertainment unit adapted to receive the corrected position signals and the fine-position value and to form the code word.

The code-word ascertainment unit may be adapted to ascertain the code word from the corrected position signals in accordance with high-order bits of the fine-position value.

The fine-position value may be ascertainable by evaluation of an incremental track extending parallel to the code.

According to example embodiments of the present invention, a method for measuring absolute position using a position-measuring device including a code having a sequence of code elements arranged one after another in a measurement direction, at least two successive code elements forming one code word having position information, the position-measuring device including a scanning unit, the scanning unit and the code arranged in a manner permitting movement relative to each other in the measurement direction, includes: emitting directed light, by a lighting unit of the scanning unit, in a direction of the code; imaging at least the code elements forming the code word onto a detector unit, the detector unit having in measurement direction at least two detector elements per code element forming the code word; ascertaining, by an evaluation unit of the scanning unit, the code word having instantaneous position information from detector signals of the detector elements; and selecting, in the evaluation unit, the detector signals to be evaluated for forming the code word as a function of the imaging of the code elements, forming the code word, onto the detector unit.

The code elements may include two successive sub-areas in the measurement direction that have properties complementary to each other, at least two detector elements may be provided per sub-area, and the method may include: feeding two detector signals to each trigger module of a signal-processing unit of the evaluation unit from detectors that have a same distance in the measurement direction as two sub-areas arranged one after another in the measurement direction; and generating, by the trigger modules, digital position signals from the detector signals based on subtraction.

The method may include forming the code word in the evaluation unit by selecting digital position signals based on correction information and a fine-position value.

The method may include: supplying the digital position signals to a selection unit; determining a selection of corrected position signals from the position signals by a correction unit based on the correction information and the fine-position value; and outputting the corrected position signals by the selection unit.

The evaluation unit may include a code-word ascertainment unit, and the method may include supplying the corrected position signals and the fine-position value to the code-word ascertainment unit for forming the code word.

Further features and aspects of example embodiments of the present invention are described in more detail below with reference to the appended Figures.

DETAILED DESCRIPTION

Figure 1A:
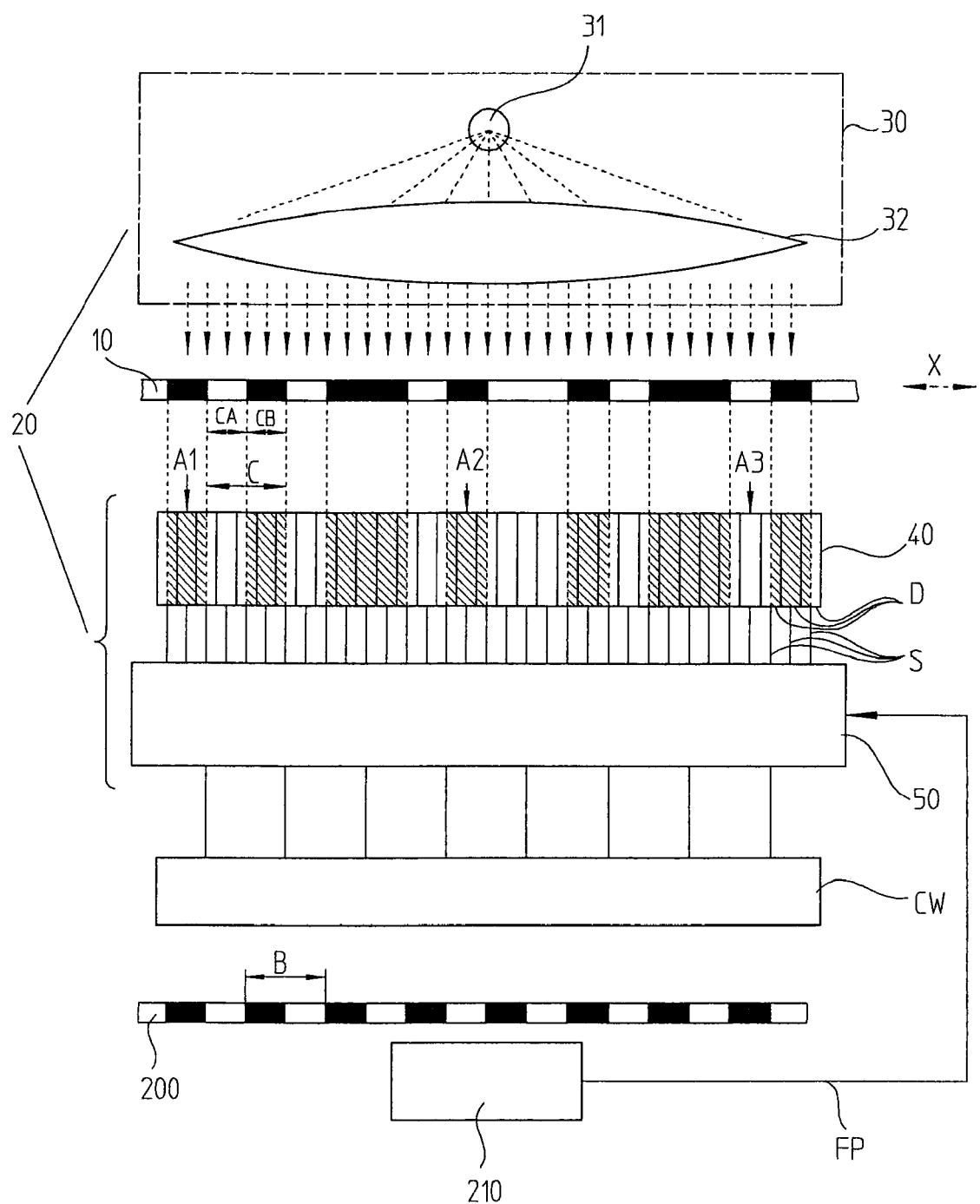
FIG. 1a is a schematic view of a position-measuring device.
Figure 1B:
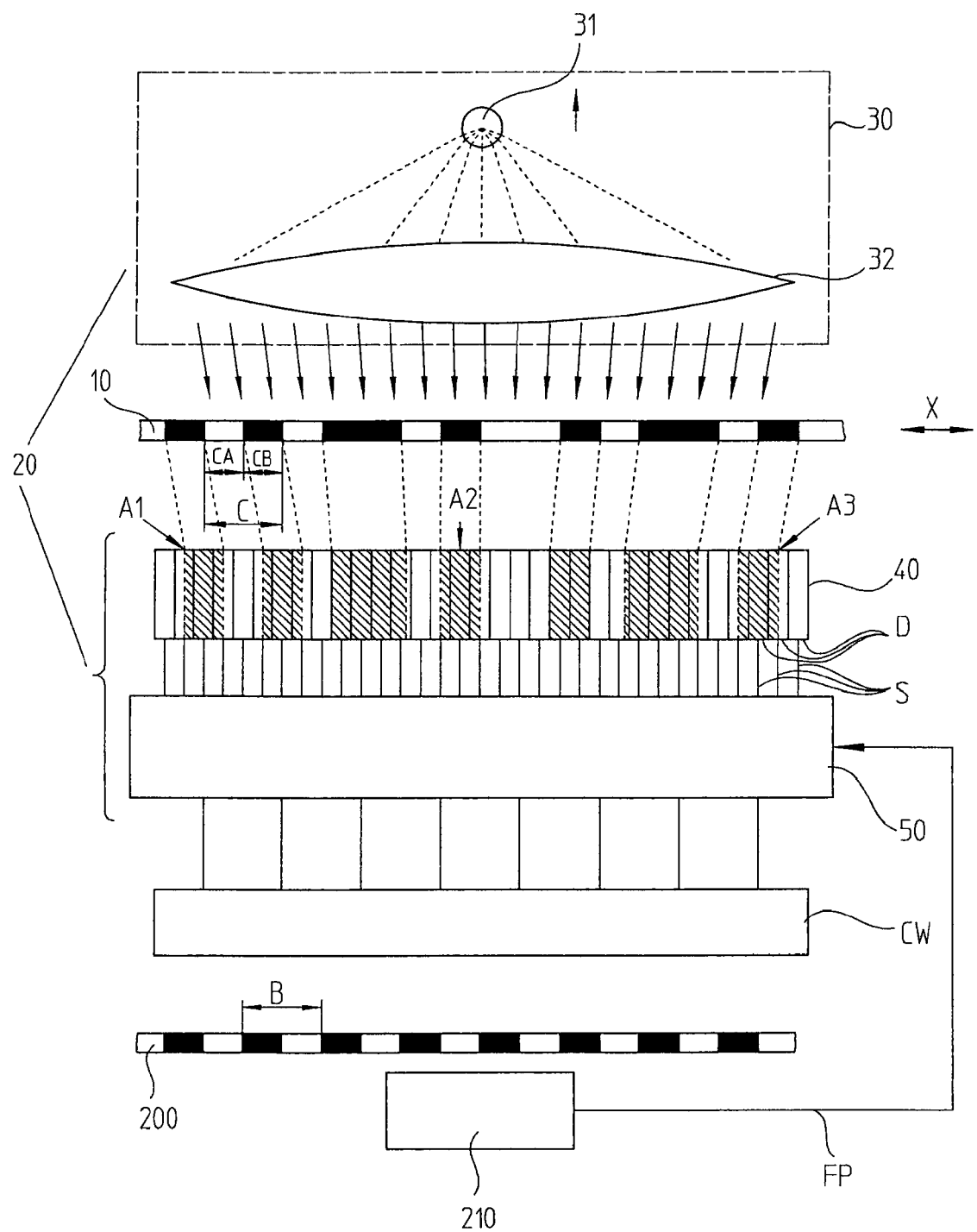
FIG. 1b is a schematic view of a position-measuring device having an improperly adjusted lighting unit.

First of all, FIGS. 1a and 1b clarify how the alignment of the light used for reading a code is able to influence the reliability of the position-value ascertainment. FIG. 1a schematically illustrates an optical position-measuring device, in which a code 10 is scanned by a scanning unit 20 that includes a lighting unit 30, a detector unit 40 and an evaluation unit 50. Code 10 is applied on a measuring standard. For example, the measuring standard may be a scale or a code disk, depending upon whether the position-measuring device is used for measuring linear or rotary positions.

Code 10 includes a sequence of code elements C of equal length disposed one after the other in measuring direction X, the position information being coded by the optical properties of code elements C. A code 10 of this kind is also referred to as a pseudo random code or PRC for short. For example, the coding may be achieved by forming code elements C to be complementary to each other. In this context, complementary means that they possess inverse optical properties, e.g., in the case of the transmitted-light scanning shown, for example, transparent and non-transparent properties, or in the case of incident-light scanning, reflecting and non-reflecting properties.

It may be provided that, as shown, code 10 has what is referred to as Manchester coding. Here, code elements C include two sub-areas CA, CB which have complementary optical properties and are disposed one after the other in the measuring direction. The digital value of such a code element C is determined by the arrangement of sub-areas CA, CB. Thus, a first digital value is assigned to a first sequence of sub-areas CA, CB formed to be complementary to each other, and a second digital value is assigned to a second sequence of sub-areas CA, CB formed to be complementary to each other. For example, the value "0" is assigned to the sequence opaque→transparent, and the value "1" is assigned to the sequence transparent→opaque.

Lighting unit 30 includes a light source 31 and a collimator lens 32. It emits directed light in the direction of code 10. Advantageously, as illustrated in FIG. 1a, the light has a parallel ray trajectory. Code 10 is imaged onto detector unit 40 according to the alignment of the light.

Detector unit 40 is a line array having a sequence of detector elements D disposed in measuring direction X. In order to permit a better illustration of the imaging of code 10 onto detector unit 40, detector unit 40, whose surface is actually facing lighting unit 30, is shown rotated in the image plane.

Shaded areas are indicated by hatching. In the relative position shown, arrow A1, for example, denotes a detector element D which is particularly well-suited for reading the code information in the left area of detector unit 40. In the same manner, arrows A2 and A3 each denote a detector element in the middle and in the right area, respectively, of detector unit 40.

Detector signals S are fed to evaluation unit 50 which ascertains a code word CW that indicates the instantaneous relative position between code 10 and scanning unit 20.

The width of detector elements D corresponds to one quarter the width of one code element C. Since both sub-areas CA, CB must be read to determine the value of a code element C, given a relative movement of scanning unit 20 with respect to code 10, four detector pairs one after another in measuring direction X are arranged in the optimal position for reading the position information. If the movement is continued, the process repeats cyclically with the next code elements C. In order to determine which detector pair should be used in each instance for reading out the value of a code element C, German Published Patent Application No. 102 44 235, which is expressly incorporated herein in its entirety by reference thereto, describes placement of an incremental track 200 parallel to code 10. Incremental track 200 is further used to generate a fine-position value FP which, in conjunction with code word CW, increases the resolution of the position-measuring device. In this connection, it may be provided that incremental track 200 is implemented such that its periodic division has a period length B corresponding to the length of one code element C of code 10. In this case, by a simple 4-fold interpolation, a fine-position value FP may be generated with which the detector pair optimally positioned in respect to the instantaneous relative position may be selected. This fine-position value FP may be coded by 2 bits. However, to permit a significant increase in the resolution of the position-measuring device, higher interpolation factors may be used. For example, a fine-position value FP has a resolution of 8 bits. To select the detector pair optimally positioned with respect to the instantaneous relative position, in this case the two high-order bits of fine-position value FP may be utilized.

The arrangement and evaluation of incremental tracks 200 are widely prevalent and are therefore not described further herein. For this reason, a fine-position evaluation unit 210 for generating fine-position value FP is merely shown in schematic form. It includes both the detectors necessary for scanning incremental track 200, as well as the signal processing and interpolation. In the present exemplary embodiment, an optical scanning principle is used, and incremental track 200 is arranged parallel to code 10 on the same measuring standard.

The alignment of the light emitted by lighting unit 30 is determined, for example, by its geometrical layout, particularly the distance of light source 31 from collimator lens 32. FIG. 1b shows the position-measuring device illustrated in FIG. 1a with a lighting unit 30 that is emitting light aligned convergently due to an improper adjustment—a larger distance between light source 31 and collimator lens 32. As a result, detector element D designated by arrow A1 is partially illuminated, while in FIG. 1a it is still completely shaded. On the other hand, detector element D denoted by arrow A3 in the right area of detector unit 40 is partially shaded. Detector element D denoted by arrow A2 in the middle area continues to be shaded, since the convergent alignment of the light has only a weak effect. The result of the improper adjustment of lighting unit 30 is therefore an altered signal amplitude of detector signals S in the outer areas of detector unit 40, which may give rise to a misreading of code 10.

Analogous thereto, a lighting unit 30 in which light source 31 is disposed closer to collimator lens 32 would emit divergent light.

The imaging of code 10 onto detector unit 40 may also be influenced by other causes, e.g., by an inaccurate alignment of scanning unit 20 with respect to code 10. This situation is addressed as well.

Figure 2:
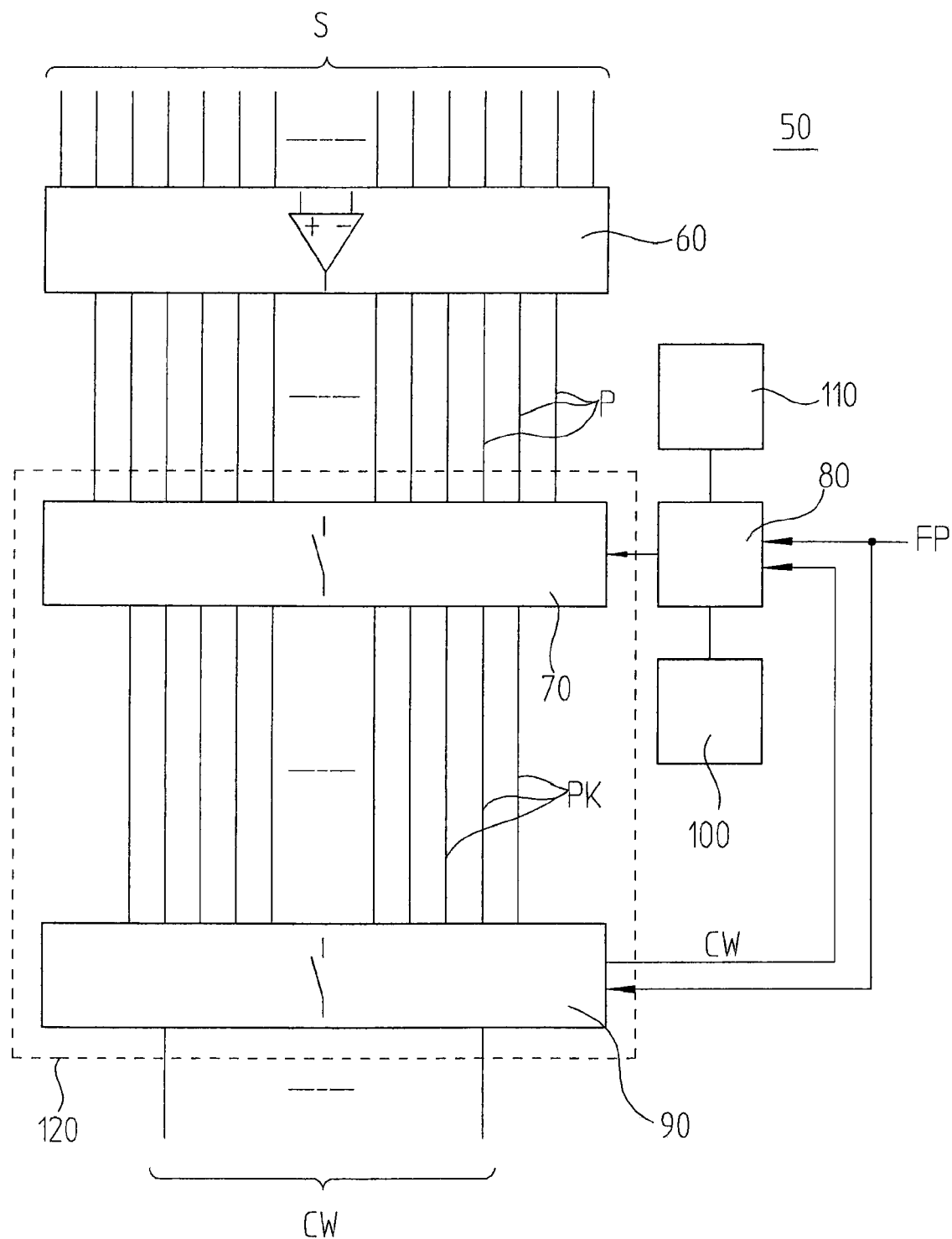
FIG. 2 is a block diagram of an evaluation unit of a position-measuring device according to an example embodiment of the present invention.

FIG. 2 is a block diagram of an evaluation unit 50 of a position-measuring device according to an example embodiment of the present invention. Detector signals S from detector unit 40 are supplied to evaluation unit 50 on the incoming side. It outputs a code word CW that indicates the relative position between code 10 and scanning unit 20 in measuring direction X.

Evaluation unit 50 includes a signal-processing unit 60, a selection unit 70 which is controllable by a correction unit 80, and a code-word ascertainment unit 90. Fine-position value FP is supplied to evaluation unit 50, as well. Therefore, evaluation unit 50 has information concerning the relative position within the absolute position determined by code 10.

Signal-processing unit 60 is used to generate digital position signals, e.g., voltage signals having defined levels, from detector signals S which, in the case of optical scanning, are mostly current signals having low signal amplitudes. For example, if code 10 to be scanned is a simple PRC, then this may be achieved using current comparators which are dimensioned such that, below a trigger threshold, a logical low signal is output, and a logical high signal is output above the trigger threshold.

For example, a PRC having a Manchester coding is used as code 10. As described in German Published Patent Application No. 102 44 235, to process detector signals S, trigger modules may be used which, depending on the signal difference of detector-signal pairs at the inputs, output a high signal or a low signal at the output. A high signal-to-noise ratio is achieved by evaluating the signal difference. It may be provided to compare the signal level of the signal difference in terms of actual amount in error-checking devices to a defined triggering threshold, and if the triggering threshold is not attained, to output an error signal. Therefore, at the output of signal-processing unit 60, position signals P are available that are able to assume three defined states: high signal, low signal and error signal.

Position signals P at the output of signal-processing unit 60 are fed to selection unit 70. It, controlled by correction unit 80, switches corrected position signals PK, selected from position signals P, through to code-word ascertainment unit 90 for further evaluation.

Corrected position signals PK are selected from position signals P with the aid of fine-position value FP and correction information. Fine-position value FP includes the information as to which corrected position signals PK—given an optimal arrangement of the position-measuring device—are switched through by code-word ascertainment unit 90, i.e., are output as code word CW. Moreover, fine-position value FP forms the output information for the selection of corrected position signals PK from position signals P. To that end, correction unit 80, with the aid of the correction information and fine-position value FP, ascertains the correct assignment between position signals P and corrected position signals PK, and switches switching unit 70 accordingly.

The correction information may include various reasons for error making a correction necessary. It is a function of the position of detectors D in detector unit 40, from whose detector signals S, position signals P result.

In the simplest case, the correction information includes static assignment information which is ascertained during a calibration process after the position-measuring device is assembled. It includes the information as to how far the imaging of code 10 onto detector unit 40 is shifted as a function of the position of detector D in detector unit 40. To store the static assignment information, for example, a memory unit 100, readable by correction unit 80, is provided in evaluation unit 50. In this context, static assignment information may be provided for each detector D of detector unit 40. However, a plurality of adjacent detectors D may also be combined to form one group to which shared static assignment information is allocated. For example, static assignment information exists in each case for groups of detectors D which are considered for the readout of one bit of code word CW.

Due to the mechanical arrangement of the position-measuring device, particularly due to mechanical tolerances in the guidance of scanning unit 20 relative to code 10, the correction information for the selection of corrected position signals PK from position signals P may include position-dependent assignment information. This therefore also takes into account the change in the imaging of code 10 onto detector unit 40 as a function of the absolute position. In this case, as a function of the absolute position, at least two items of assignment information—which in turn may be available per detector D or perhaps per group of detectors D—are able to be stored in memory unit 100, and corrected position signals PK are selected as a function of the instantaneous absolute position of code 10 with respect to scanning unit 20. To that end, code word CW is supplied to correction unit 80. Correction unit 80 is able, as a function of code word CW, to read out from memory 100 the assignment information, valid for the current position, per detector or detector group, and to switch selection unit 70 accordingly.

The assignment of position signals P to corrected position signals PK may have a temperature dependency. Therefore, the correction information may also include temperature-dependent assignment information. That is why at least one temperature sensor 110 may be provided which measures the temperature at least one location in the position-measuring device relevant for the selection of corrected position signals PK and transmits the temperature value to correction unit 80. Based on static assignment information stored in memory unit 100 and valid for a reference temperature, for example, correction unit 80 is able to correct the assignment of position signals P to corrected position signals PK as a function of the temperature of temperature sensor 110, and to switch selection unit 70 accordingly.

Code-word ascertainment unit 90 ascertains code word CW from corrected position signals PK. Code word CW is ascertained by selecting those corrected position signals PK which optimally read out a code element C at the instantaneous relative position between code 10 and scanning unit 20. To that end, fine-position value FP is supplied to code-word ascertainment unit 90. As described above, the selection is made via the two high-order bits of fine position-value FP.

In the exemplary embodiment described, code word CW is ascertained from position signals P in two steps by first selecting corrected position signals PK from position signals P in selection unit 70, and then ascertaining code word CW from them in code-word ascertainment unit 90. In a further example embodiment, selection unit 70 and code-word ascertainment unit 90 are combined in one switching unit 120. Code word CW is ascertained in a manner that, first of all in correction unit 80, for each bit of code word CW, corresponding position signal P is ascertained without correction based on fine-position value FP, and then, with the aid of fine-position value FP and correction information, it is determined whether position signal P ascertained is suitable for forming the bit of the code word, or whether an adjacent position signal P must be selected.

Figure 3A:
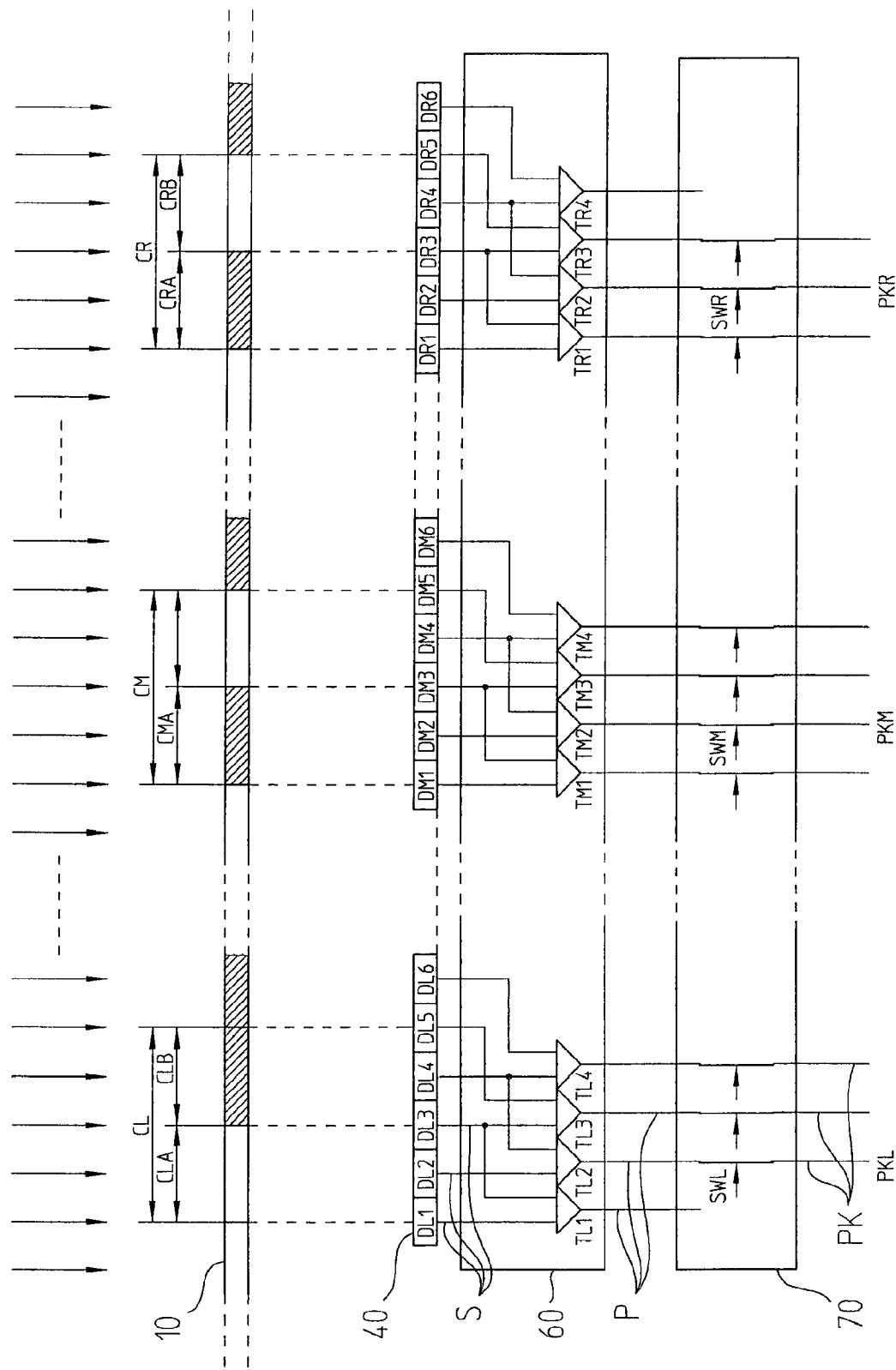
FIG. 3a illustrates the selection of the detector signals in a position-measuring device in the case of light aligned in parallel.
Figure 3B:
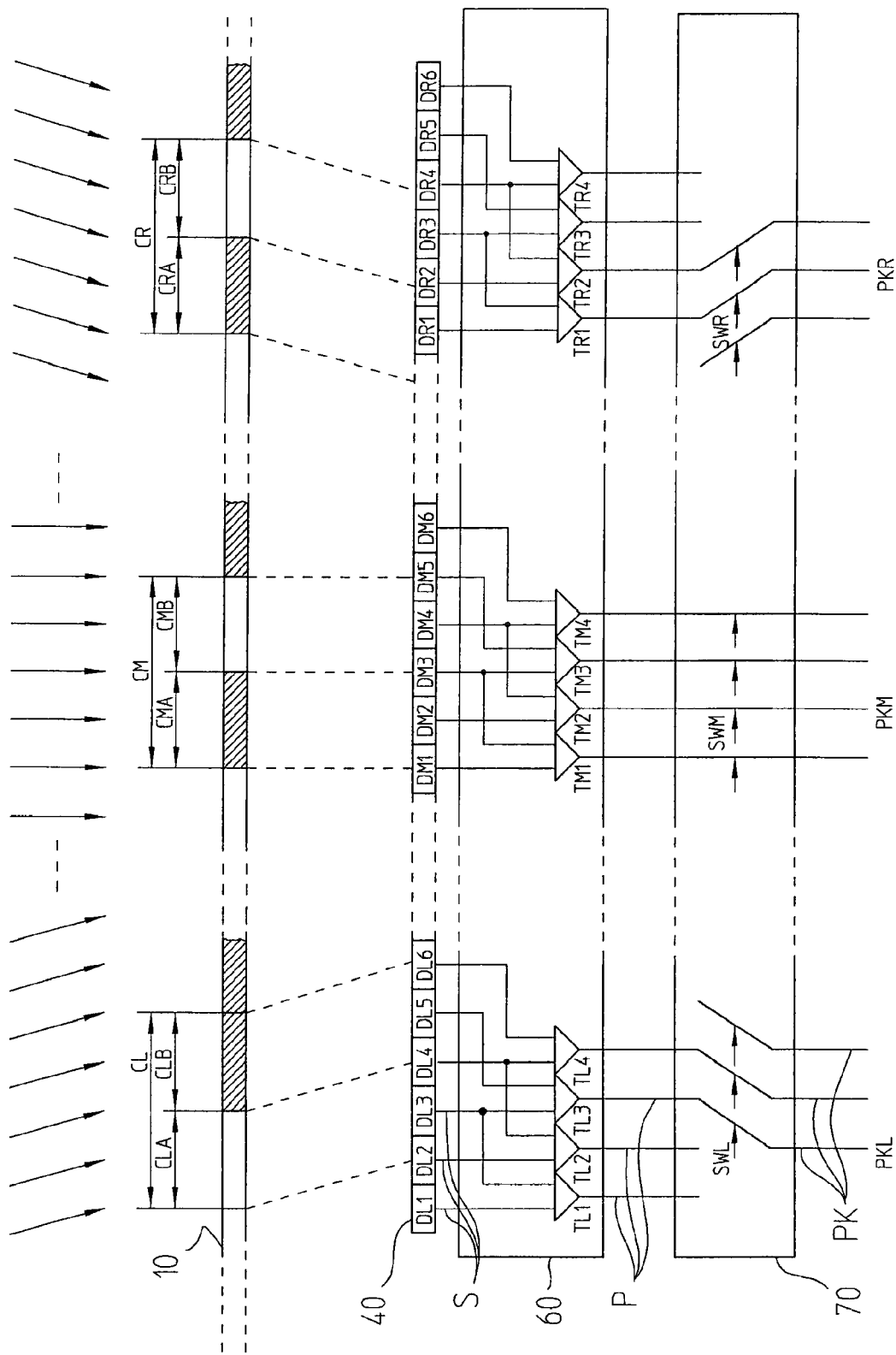
FIG. 3b illustrates the selection of the detector signals in a position-measuring device in the case of convergently aligned light.
Figure 3C:
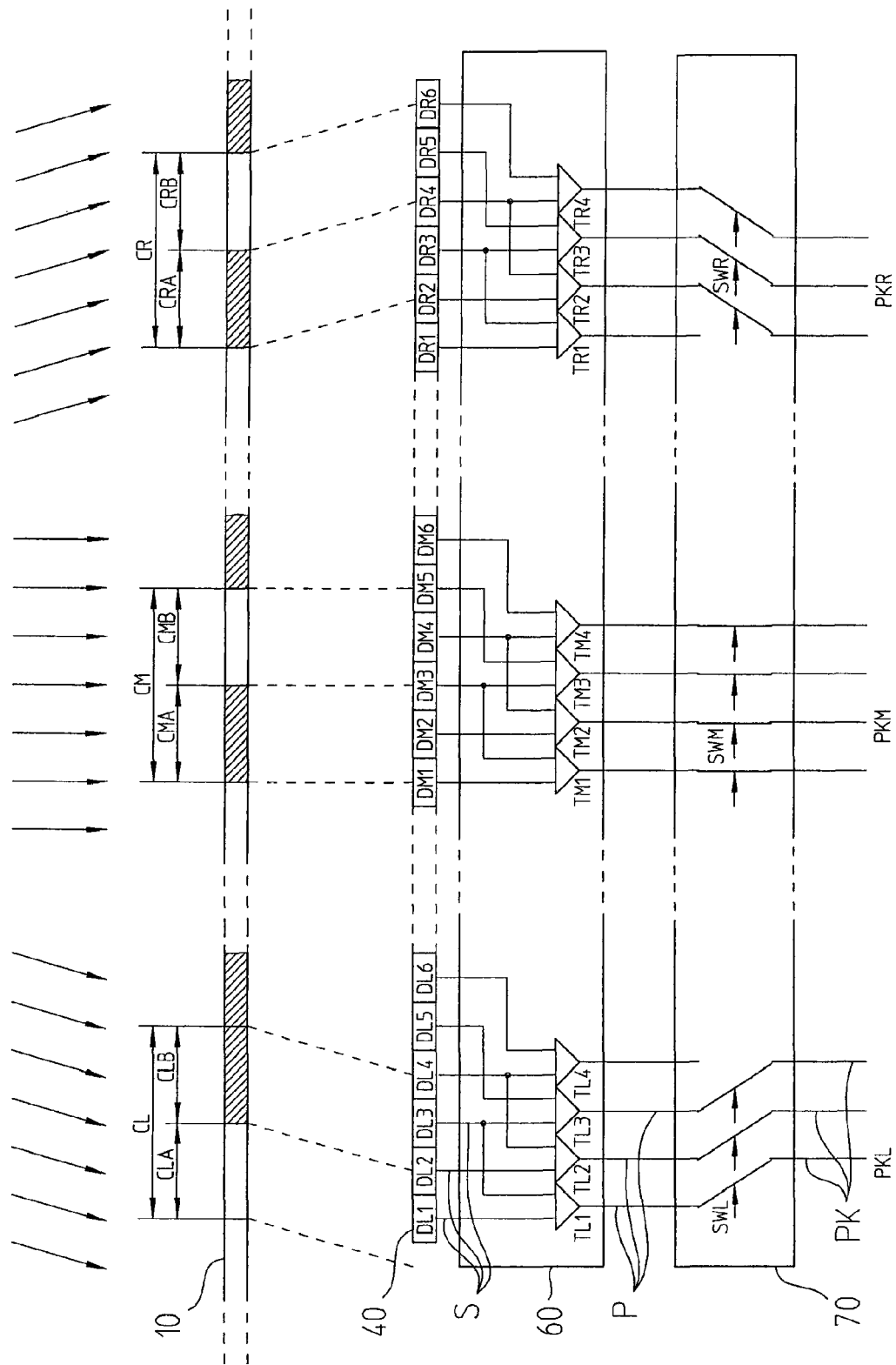
FIG. 3c illustrates the selection of the detector signals in a position-measuring device in the case of divergently aligned light.

With reference to FIGS. 3a to 3c, the selection of the detector signals in a position-measuring device is further described in the case of parallel, convergently and divergently directed light. FIGS. 3a to 3c illustrate cutaway portions of code 10, which is imaged onto detector unit 40, signal-processing unit 60 and selection unit 70. Lighting unit 30 is not illustrated for reasons of clarity. Instead, the alignment of the light is indicated by arrows.

In each case, a left code element CL, a right code element CR and a middle code element CM of code 10 are illustrated. Code 10 is a Manchester-coded PRC. Therefore, left code element CL includes two sub-areas CLA and CLB which are imaged onto left detector elements DL1 to DL6, right code element CR includes two sub-areas CRA and CRB which are imaged onto right detector elements DR1 to DR6, and middle code element CM includes two sub-areas CMA and CMB which are imaged onto middle detector elements DM1 to DM6. Two detector elements D are provided per sub-area CLA, CLB; CRA, CRB; CMA, CMB. Thus, even-numbered detector elements DL2, DL4, DL6; DR2, DR4, DR6; DM2, DM4, DM6 following one another in measuring direction X, as well as odd-numbered detector elements DL1, DL3, DL5; DR1, DR3, DR5; DM1, DM3, DM5 following one another in measuring direction X have the same distance relative to each other as two sub-areas CLA, CLB; CRA, CRB; CMA, CMB of the code elements following one another in the measuring direction. In this manner, in any relative position of code 10 with respect to scanning unit 20, at least one detector element is assigned unambiguously to each sub-area CLA, CLB; CRA, CRB; CMA, CMB. This means an unambiguous code word CW is ascertainable at each relative position.

In signal-processing unit 60, detector signals S are in each instance supplied in pairs—either the detector signals of two odd-numbered detectors disposed one after the other in the measuring direction or of two evenly-numbered detectors disposed one after the other in the measuring direction—to trigger modules which, by subtraction and comparison in terms of absolute value to a setpoint difference, at their outputs output digital position signals P which are able to assume three values: high signal corresponding to a logic "1", low signal corresponding to a logic "0" or an error signal when the difference of the detector signals falls below the setpoint difference in terms of absolute value. The selected arrangement ensures that at every relative position, each code element C is read out optimally by at least one detector pair.

Position signals P are supplied to selection unit 70 which includes switch elements SW, by which corrected position signals PK are selectable from position signals P.

The functioning of selection unit 70 is described with reference to FIGS. 3a, 3b, 3c based only on one left corrected position signal PKL, one right corrected position signal PKR and one middle corrected position signal PKM, the selection being made with the aid of a left switch element SWL, a middle switch element SWM and a right switch element SWR. Further switch elements SW for adjacent corrected position signals PK are indicated in each case, but are not further described. However, it should be apparent this description is applicable to all further corrected position signals PK.

As illustrated in FIG. 3a, the light emitted by lighting unit 30 for the imaging of code 10 onto detector unit 40 is aligned substantially in parallel. In the case of the position-measuring device described, this corresponds to the setpoint alignment of the light which leads to optimal imaging of code 10 onto detector unit 40. In the relative position between code 10 and detector unit 40 shown, on the left side of detector unit 40, detector elements DL2 and DL4 are positioned optimally for reading out the position information of code element CL. Correction unit 80 switches a left switch element SWL assigned to left corrected position signal PKL accordingly, so that the position signal output by trigger module TL2 is linked to the output of left corrected position signal PKL. Correspondingly, a right switch element SWR switches the output of trigger module TR2 to the output of right corrected position signal PKR, and a middle switch element SWM switches the output of trigger module TM2 to the output of middle corrected position signal PKM.

In contrast, in FIG. 3b, the light from lighting unit 30 has a convergent optical path. This results in an altered imaging of code 10 onto detector unit 40, so that, given the same relative position, on the left side of detector unit 40, detector elements DL3 and DL5 are particularly well-suited for reading out the position information of code element CL, on the right side, detector elements DR1 and DR3 are especially well-suited for reading out the position information of code element CR, and in the middle, since the alignment of the light is mainly unchanged, detector elements DM2 and DM4 continue to be well-suited for reading out the position information of code element CM. To ensure a reliable readout, correction unit 80 switches left switch element SWL such that the output of trigger module TL3 is switched to left corrected position signal PKL, and switches right switch element SWR so that the output of trigger module TR1 is switched to right corrected position signal PKR. The position of switch element SWM remains unchanged.

As illustrated in FIG. 3c, the light from lighting unit 30 is divergently aligned. This means that, given the same relative position of detector unit 40 and code 10, on the left side of detector unit 40, detector elements DL1 and DL3 are optimally illuminated or completely shaded, while detector elements DL2 and DL4 are only partially shaded or partially illuminated. Correspondingly, on the right side of detector unit 40, detector elements DR3 and DR5 are to be selected for determining the position information. To that end, it may be necessary to supplement detector unit 40 by further detector elements D. The position of switch element SWM remains unchanged in this case, as well.

In the exemplary embodiment described, selection unit 70 is disposed between signal-processing unit 60 and code-word ascertainment unit 90. The selection as to which detector signals S are used for ascertaining code word CW is thus made from digital position signals P generated in signal-processing unit 60 from pairs of detector signals S. However, selection unit 70 may also be positioned at a different point in the process of processing detector signals S to form code word CW, e.g., between detector unit 40 and signal-processing unit 60. In this case, detector signals S used for ascertaining code word CW are selectable directly.

Figure 4:
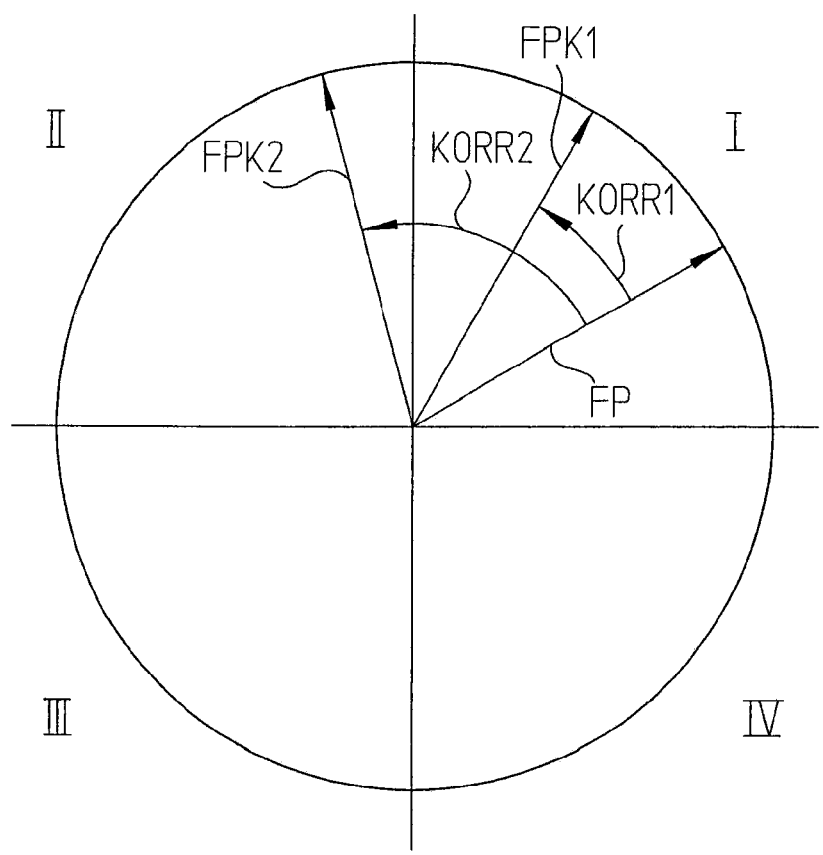
FIG. 4 is a vector diagram of the fine-position value.

FIG. 4 illustrates again how corrected position signals PK, i.e., the individual bits of code word CW, are selected from position signals P. To that end, fine-position value FP, which in this example, has a width of 8 bits, is shown in a vector diagram. In response to a relative movement of scanning unit 20 and code 10 in measuring direction X, the vector of fine-position value FP passes in succession through the four quadrants of the diagram corresponding to the four detector pairs, which are optimally positioned one after the other for reading out a code element C. In which of the four quadrants the vector is situated is determined by the two high-order bits of fine-position value FP.

From the static or position-dependent assignment information stored in memory unit 100, and possibly from the temperature-dependent assignment information derived from temperature sensor 110, correction unit 80 ascertains correction information KORR1 or KORR2, which, for example, are include 8-bit words. In order to determine whether, at the instantaneous position, the assignment of corrected position signals PK to position signals P for the ascertainment of the individual bits of code word CW is correct, as shown in FIG. 3a, or whether, corresponding to FIGS. 3b and 3c, a correction is necessary, correction unit 80 adds correction information KORR1, KORR2 to fine-position value FP, and thus obtains corrected fine-position values FPK1 and FPK2, respectively. In this context, if, as in the addition of first correction information KORR1 to fine-position value FP, the two high-order bits remain the same, then no correction is necessary, since the vectors of fine-position value FP and of resulting first corrected fine-position value FPK1 are in the same quadrant. On the other hand, if, as in the addition of second correction information KORR2 to fine-position value FP, at least one of the two high-order bits changes, then a correction must be made, since the vectors of fine-position value FP and of resulting second corrected fine-position value FPK2 are in different quadrants.

The form in which code word CW is output is not important. Thus, the output may take place both in parallel, as shown, and serially. Moreover, to output the result, e.g., to a machine-tool control, still further components may be included in scanning unit 20.

For example, scanning unit 20, particularly detector unit 40 and evaluation unit 50, is implemented wholly or partially as a large-scale-integrated, application-specific component (ASIC).

The absolute position-measuring device may be used for measuring linear or rotary movements, code 10 being applied on one of the object movable relative to each other, and scanning unit 20 being mounted on the other of the objects to be measured. In so doing, code 10 may be applied directly on the object to be measured or on a scale which the, in turn, is coupled to the object to be measured.

The objects to be measured may be the table and the slide of a machine tool or of a coordinate-measuring machine, or perhaps the rotor and the stator of an electric motor.

What is claimed is:

1. A position-measuring device, comprising:
   a code including a sequence of code elements arranged one after another in a measurement direction, at least two successive code elements forming one code word having position information; and
   a scanner unit, the scanner unit and the code arranged to permit movement relative to each other in the measurement direction, the scanner unit including:
   a detector unit having, in the measurement direction, at least two detector elements per code element forming the code word;
   a light unit adapted to emit directed light in a direction of the code to image at least the code elements forming the code word onto the detector unit; and
   an evaluation unit adapted to ascertain, from detector signals of the detector elements, the code word having instantaneous position information and to select the detector signals to be evaluated to form the code word as a function of the imaging of the code elements forming the code word onto the detector unit.

2. The position-measuring device according to claim 1, wherein the code elements include two successive sub-areas in the measurement direction that have properties complementary to each other, and at least two detector elements are provided per sub-area.

3. The position-measuring device according to claim 1, wherein the evaluation unit includes a signal-processing unit adapted to generate digital position signals from the detector signals.

4. The position-measuring device according to claim 3, wherein the signal-processing unit includes trigger modules adapted to generate the digital position signals from the detector signals based on subtraction, each trigger module arranged to receive two detector signals from detectors that have a same distance in the measurement direction as two sub-areas disposed one after another in the measurement direction.

5. The position-measuring device according to claim 3, wherein the evaluation unit includes a device adapted to form the code word by selection of position signals based on correction information and a fine-position value.

6. The position-measuring device according to claim 5, wherein the evaluation unit includes:
   a selection unit adapted to receive the digital position signals and to output corrected positional signals; and
   a correction unit adapted to determine a section of the corrected position signal based on the correction information and the fine-position value.

7. The position-measuring device according to claim 6, wherein the correction information includes static assignment information.

8. The position-measuring device according to claim 6, wherein the correction information includes position-dependent assignment information.

9. The position-measuring device according to claim 7, wherein the evaluation unit includes a memory unit adapted to store the static assignment information.

10. The position-measuring device according to claim 8, wherein the evaluation unit includes a memory unit adapted to store the position-dependent assignment information.

11. The position-measuring device according to claim 6, wherein the evaluation unit includes at least one temperature sensor, the correction information including temperature-dependent assignment information.

12. The position-measuring device according to claim 6, wherein the evaluation unit includes a code-word ascertainment unit adapted to receive the corrected position signals and the fine-position value and to form the code word.

13. The position-measuring device according to claim 12, wherein the code-word ascertainment unit is adapted to ascertain the code word from the corrected position signals in accordance with high-order bits of the fine-position value.

14. The position-measuring device according to claim 12, wherein the fine-position value is ascertainable by evaluation of an incremental track extending parallel to the code.

15. A method for measuring absolute position using a position-measuring device including a code having a sequence of code elements arranged one after another in a measurement direction, at least two successive code elements forming one code word having position information, the position-measuring device including a scanning unit, the scanning unit and the code arranged in a manner permitting movement relative to each other in the measurement direction, comprising:
   emitting directed light, by a lighting unit of the scanning unit, in a direction of the code;
   imaging at least the code elements forming the code word onto a detector unit, the detector unit having in measurement direction at least two detector elements per code element forming the code word;
   ascertaining, by an evaluation unit of the scanning unit, the code word having instantaneous position information from detector signals of the detector elements; and
   selecting, in the evaluation unit, the detector signals to be evaluated for forming the code word as a function of the imaging of the code elements, forming the code word, onto the detector unit.

16. The method according to claim 15, wherein the code elements include two successive sub-areas in the measurement direction that have properties complementary to each other, at least two detector elements being provided per sub-area, the method further comprising:
   feeding two detector signals to each trigger module of a signal-processing unit of the evaluation unit from detectors that have a same distance in the measurement direction as two sub-areas arranged one after another in the measurement direction; and
   generating, by the trigger modules, digital position signals from the detector signals based on subtraction.

17. The method according to claim 16, further comprising forming the code word in the evaluation unit by selecting digital position signals based on correction information and a fine-position value.

18. The method according to claim 17, further comprising:
   supplying the digital position signals to a selection unit;
   determining a selection of corrected position signals from the position signals by a correction unit based on the correction information and the fine-position value; and
   outputting the corrected position signals by the selection unit.

19. The method according to claim 18, wherein the correction information includes static assignment information.

20. The method according to claim 18, wherein the correction information includes position-dependent assignment information.

21. The method according to claim 18, wherein the evaluation unit includes at least one temperature sensor, and the correction information includes temperature-dependent assignment information.

22. The method according to claim 18, wherein the evaluation unit includes a code-word ascertainment unit, the method further comprising supplying the corrected position signals and the fine-position value to the code-word ascertainment unit for forming the code word.

23. The method according to claim 21, wherein the code word is ascertained from the corrected position signals in accordance with high-order bits of the fine-position value.

* * * * *